(12) United States Patent
Erlandson

(10) Patent No.: US 9,872,553 B1
(45) Date of Patent: Jan. 23, 2018

(54) SUPPORT SYSTEM AND CARRYING CASE FOR OPTICAL INSTRUMENT

(71) Applicant: Dale L. Erlandson, Antigo, WI (US)

(72) Inventor: Dale L. Erlandson, Antigo, WI (US)

( * ) Notice: Subject to any disclaimer, the term of this patent is extended or adjusted under 35 U.S.C. 154(b) by 0 days.

(21) Appl. No.: 15/664,791

(22) Filed: Jul. 31, 2017

Related U.S. Application Data

(60) Provisional application No. 62/369,369, filed on Aug. 1, 2016.

(51) Int. Cl.
| | |
|---|---|
| *A45F 5/00* | (2006.01) |
| *A45C 11/08* | (2006.01) |
| *A45F 3/00* | (2006.01) |
| *A45C 13/10* | (2006.01) |

(52) U.S. Cl.
CPC ............... *A45F 3/00* (2013.01); *A45C 11/08* (2013.01); *A45C 13/1069* (2013.01); *A45F 5/00* (2013.01); *A45F 2003/002* (2013.01); *A45F 2200/0533* (2013.01); *Y10S 224/909* (2013.01)

(58) Field of Classification Search
CPC .................... Y10S 224/909; A45F 5/00; A45F 2200/0533; A45F 2003/142; G03B 17/561; G02B 23/18; A45C 11/08
See application file for complete search history.

(56) References Cited

U.S. PATENT DOCUMENTS

| | | |
|---|---|---|
| 2,270,931 A | 1/1942 | Corcoran |
| 2,643,803 A | 6/1953 | Bates et al. |
| 3,297,218 A | 1/1967 | Cassidy et al. |
| 3,326,430 A | 6/1967 | Banks |
| 3,526,347 A | 9/1970 | Kuban |
| 3,782,614 A | 1/1974 | Campisi |
| 4,091,974 A | 5/1978 | McClintock |
| 4,125,211 A | 11/1978 | Handsman |
| 4,168,022 A | 9/1979 | Brewer |
| 4,232,808 A | 11/1980 | Gray |
| 4,328,917 A | 5/1982 | Reeberg |
| 4,349,139 A | 9/1982 | Oishi |
| 4,416,405 A | 11/1983 | Caillouet |
| 4,637,535 A | 1/1987 | Aleman |
| 4,649,973 A | 3/1987 | Uchin |
| 4,898,311 A | 2/1990 | Boyer |
| 4,976,388 A | 12/1990 | Coontz |
| 5,016,797 A | 5/1991 | Rowledge |

(Continued)

FOREIGN PATENT DOCUMENTS

GB 2037150 A * 7/1980 ............. A45C 11/38

*Primary Examiner* — Justin Larson
(74) *Attorney, Agent, or Firm* — Boardman & Clark LLP

(57) ABSTRACT

A support system for an optical instrument having a neck strap with lower ends for supporting the instrument on the torso of a user, the system including an carrying case having a top opening and supportable by a pair of elastomeric case support straps each coupleable to an intermediate portion of the neck strap to position the case to enclose the instrument, and a strap assembly coupleable to the lower portion of the case and attachable to a belt or garment of a user, wherein downward displacement of the case will expose the instrument for removal and elevation to eye level use by the user, whereby the case will be elevated and returned to its carrying position, and a case lid having a closure fastener releaseable upon downward movement of the case for permitting removal and reception of the instrument for use and storage.

10 Claims, 5 Drawing Sheets

(56) References Cited

U.S. PATENT DOCUMENTS

| | | | |
|---|---|---|---|
| 5,065,919 | A | 11/1991 | Sims |
| 5,172,838 | A | 12/1992 | Rowell et al. |
| 5,221,991 | A | 6/1993 | Webster |
| 5,230,451 | A | 7/1993 | Onozawa |
| 5,307,967 | A | 5/1994 | Seals |
| 5,320,261 | A | 6/1994 | Andersen |
| D351,061 | S * | 10/1994 | Coons .......................... D3/219 |
| 5,360,149 | A | 11/1994 | Lucot |
| D369,676 | S | 5/1996 | Palmer |
| 5,644,794 | A * | 7/1997 | Hull ................... A41D 13/0012 2/102 |
| 5,662,252 | A | 9/1997 | Martin |
| 5,740,952 | A | 4/1998 | Huckenbeck |
| 5,816,464 | A | 10/1998 | Seiler |
| 6,021,983 | A | 2/2000 | Congdon |
| 6,095,328 | A | 8/2000 | Smithbaker, III et al. |
| 6,648,191 | B2 | 11/2003 | Giggleman |
| 6,926,184 | B2 | 8/2005 | Hancock et al. |
| 7,036,943 | B1 | 5/2006 | Brewer |
| 7,828,180 | B2 | 11/2010 | Slesar |
| 9,210,978 | B1 * | 12/2015 | Hunt ...................... A45C 11/38 |
| 9,332,822 | B2 * | 5/2016 | Hunt ........................ A45F 5/14 |
| 2006/0151563 | A1 * | 7/2006 | Bussard ................... A45F 5/00 224/664 |

\* cited by examiner

SUPPORT SYSTEM AND CARRYING CASE FOR OPTICAL INSTRUMENT

CROSS REFERENCE TO RELATED APPLICATION

This application claims priority to U.S. Provisional Patent Application, Ser. No. 62/369,369, filed Aug. 1, 2016, entitled CARRYING CASE AND SUPPORT SYSTEM FOR OPTICAL INSTRUMENT, the entire contents of which is hereby incorporated herein by reference.

FIELD

The present invention relates to the field of support systems and personal carrying cases for optical instruments such as binoculars, cameras, including digital electronic instruments with still camera and video capabilities where viewing the camera target subject through the instrument is desirable, and more particularly, optical instrument support systems and carrying cases which provide convenient and easy access to the instrument by the user for opportunistic optical viewing of scenic and other target subjects.

BACKGROUND

Personal binoculars, and other viewing instruments such as cameras, are frequently carried in the field to provide enhanced viewing and photo opportunities which may present themselves as the user moves from place to place or is positioned in a strategic position to see changing scenery, birds, animals, people or events of interest. Often such users may also be carrying other equipment such as chairs, walking staffs, sporting arms, food and/or beverages, etc. so that cases and carrying straps are employed to support and protect such instruments (hereinafter sometimes referred to simply as "binoculars" for convenience) from loss or damage between uses and to permit the user to otherwise have hands free for tasks other than carrying the binoculars. Various case, strap and carrying systems have been provided with varying results in an effort to provide comfortable and secure locations of such binoculars in position for quick and convenient access when a viewing or photo opportunity is presented. However, such prior systems have been lacking in one or more important aspects of simplicity, security, convenient and quick access, ease of use of the binoculars and efficient return of the binoculars to a secure and convenient position between use opportunities.

SUMMARY

The present invention utilizes a neck strap coupled at each of its ends to opposite sides of the binoculars. The neck strap is of a selectable fixed length to extend around the user's neck and position the binoculars at a mid-chest position on the user's body. A carrying case is provided to enclose the binoculars during periods of non-use. The carrying case preferably substantially encloses the binoculars on all four sides, bottom and top, with the top portion exemplarily comprising a lid flexibly coupled to a back side of the case and substantially covering a top opening of the case when in its closed position. The lid has strap indents at its side corners to accommodate the two end portions of the neck strap extending generally from the sides of the binoculars to vertically support the binoculars adjacent to the chest of the user. If provided, the lid is pivotable about its line of flexible attachment to the case to permit the lid to be opened for insertion and removal of the binoculars to and from the interior of the case, and to be closed for retention and protection of the binoculars within the case between uses of the binoculars. An attachment to or an extension of the lid extends over the upper portion of a side of the case and is releasably coupled thereto, exemplarily by a two-part magnetic fastener device. A pair of elastic case support straps are exemplarily coupled to the back side of the case and extend upwardly and coupled to an adjacent side of the neck strap at a point between the binoculars and the upper looped end of the neck strap. A bottom strap assembly extends from the bottom end of the case and is flexibly coupled to a belt or garment portion of the user. When the user wishes to access the binoculars the user pushes down on the bottom strap. The case support straps are thereby caused to elastically extend in length to allow the case to move downwardly. When the lid of the case is impeded in its downward movement by the binoculars the magnetic or other releasable fasteners release to allow the lid to open and the case to continue its downward movement until the binoculars are substantially withdrawn from the case and the binoculars can be easily grasped and raised to eye level by the user. The bottom strap assembly is released when the binoculars are removed from the case and the case will resume an equilibrium position between belt and upper chest level as it is supported by the elastic straps and neck strap end portions as the binoculars are used for viewing. When such use ends, the user may simply return the binoculars to the case, and close the lid to automatically engage the releasable magnetic fastener device. Thus the binoculars are accessed by simply pushing down on the bottom strap assembly of the case to expose the binoculars for removal and use, and efficiently returned to the case after use by reinserting the binoculars in the case and closing the lid to engage the magnetic fastener device.

These and other features and advantages of devices, systems, and methods according to this invention are described in, or are apparent from, the following detailed descriptions of various examples of embodiments.

BRIEF DESCRIPTION OF DRAWINGS

Various examples of embodiments of the systems, devices, and methods according to this invention will be described in detail, with reference to the following figures, wherein.

DETAILED DESCRIPTION

Figure 1:
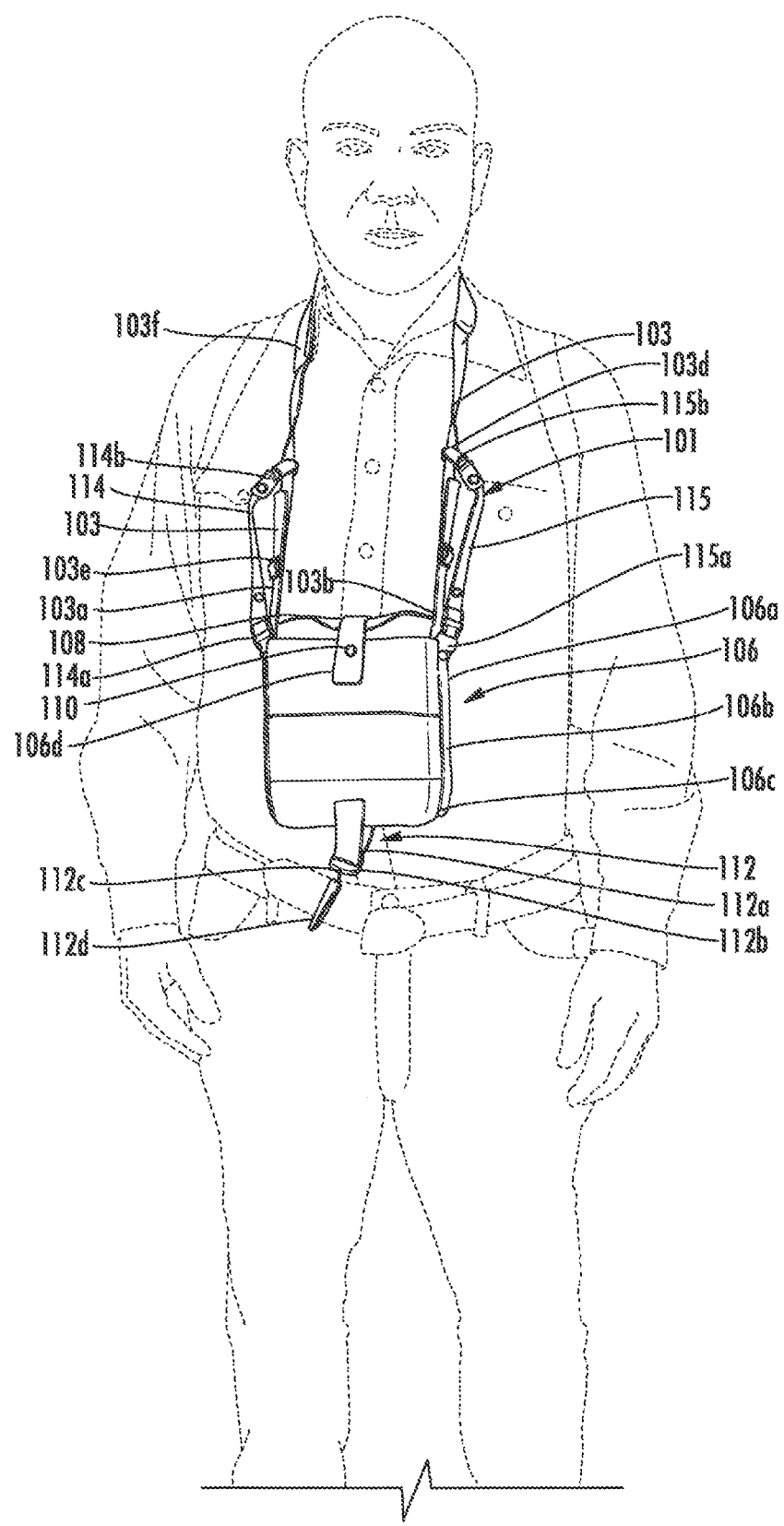
FIG. 1 shows a binocular case according to an exemplary embodiment of the present invention being worn by a user in a normal carrying position and enclosing a set of binoculars (not visible) supported by a neck strap having a selected fixed length to position the binoculars and carrying case at an optimum height on the torso of the user.

Referring more particularly to FIGS. 1-5, it is seen that a carrying case 106 for an optical instrument is positioned in FIG. 1 by support system 101 on the front torso of a user in a preferred carrying position located between belt level and upper chest level of the user. In the illustrated exemplary embodiment shown in FIGS. 1-5, binoculars 102 are the illustrated optical instrument, but could also be a camera of any kind, a personal digital electronic instrument having camera capabilities or any other kind of field use optical instrument intended to be brought to user eye level for viewing. The illustrated carrying case 106 encloses binoculars 102 supported by a neck strap 103 having a first end portion 103a which is coupled to a first side of the binoculars near the viewing end, and a second end portion 103b which is coupled to a second side of the binoculars near the viewing end of the binoculars. The neck strap is comprised of a non-elastomeric material such as leather and has a selectable fixed length, which length can be adjusted by use of a conventional buckle, adjustable sliders, hook and loop type adjustment ends or any other known or unknown suitable strap length adjustment device(s) 103e to position the case at a desired carrying height on the torso of the user. The neck strap 103 can also include a mid-length, broadened neck support portion 103f which will be engaged by the neck of the user when the binoculars are in a carrying position as shown in FIG. 1. The neck strap 103 may be a conventional camera neck strap which is supplied by the camera manufacturer, or can be provided as a part of the support system 101.

The exemplary carrying case 106 has a back panel or back side 106a which can extend marginally sideward on each side of the body of the case 106 to permit coupling thereto of the lower ends 114a and 115a of first and second elastic case support straps 114 and 115, respectively, near the upper ends of the marginal side portions, or at any other generally upper side location of the case. The upper ends 114b and 115b of the first and second elastic case support straps 114 and 115 are respectively attached to intermediate portions of the first side 103c and second side 103d of the neck strap 103 at points approximately mid-way between their points of coupling to the binoculars and the shoulder line of the user, as generally shown in the Figures Typically, the case support straps 114 and 115 can be fixedly coupled to the case 106, and releasably coupled to the neck strap 103, as by suspender clamp type clips 114c and 115c or any other releasable coupling members of conventional or future design so that the case support straps 114 and 115 and case 106 can be easily separated from the neck strap 103 and the case 106. Accordingly, the binoculars 102 and neck strap 103 can be used separately from the case 106 and support straps 114 and 115 if the user desires, particularly when the user is not using the binoculars 102 in the field. If the neck strap 103 is provided as a part of the support system 101, the support straps 114 and 115 may be fixedly attached to the neck strap intermediate portions by conventional rivets or other permanent or releasable fasteners (not shown). However, if permanently attached, it is advantageous to provide any conventional releasable coupling means (not shown) in the support straps near their upper ends 114b and 115b so that the neck strap 103 and attached optical instrument 102 may be separated from the rest of the support system 101 when not in the field. The case 106 further has a body portion for enclosing the binoculars 102 which body portion includes a case front side 106b coupled to the case back side 106a, which front side encloses the front and sides of the contained binoculars below a top opening of the case 106, and a case bottom 106c coupled to the back side 106a and front side 106b which encloses and protects the objective lenses of the binoculars.

In addition, the exemplary case 106 includes a lid 108 which is pivotably or at least flexibly coupled to the top of the case back side 106a along a line of flexible attachment. When closed, the lid 108 substantially covers the case top opening and eye pieces of the binoculars 102, and may overhang or have a lid extension 106d which overhangs the front side 106b of the case 106, with a releasable magnetic fastener device 110 coupling the lid extension 106d to the case front side 106b. The releasable magnetic fastener device 110 should have enough magnetic attraction between magnet and magnetized portions to separate after moderate tension is exerted on the device by an upward force exerted against the lid 108 by the binoculars 102 as a result of the case 106 being withdrawn from encompassment of the binoculars 102, as further described below. Other types of suitable releasable fasteners, including light duty hook and loop type fasteners, may be used to secure the lid 108 to the case front side 106b, so long as only a moderate force is required to separate the secured parts as the case is initially withdrawn from the binoculars. The lid 108 can also define strap indents 108a at its opposite side corners to accommodate each of the two neck strap end portions 103a and 103b which support the binoculars 102 and the surrounding case 103 when the binoculars are in the carrying position shown in FIGS. 1 and 2. Depending upon the type and shape of optical instrument 102 that is to be protected, the case 106 may not include a lid. For example, a digital electronic instrument may have a relatively flat, thin body and may slip into a thin case with a snap-shut or other self-closing top opening (not shown) of any conventional design. The support system 101 will then operate substantially as described herein to allow the digital instrument to emerge and be removed from the case, or reinserted into the case in a convenient manner.

Figure 2:
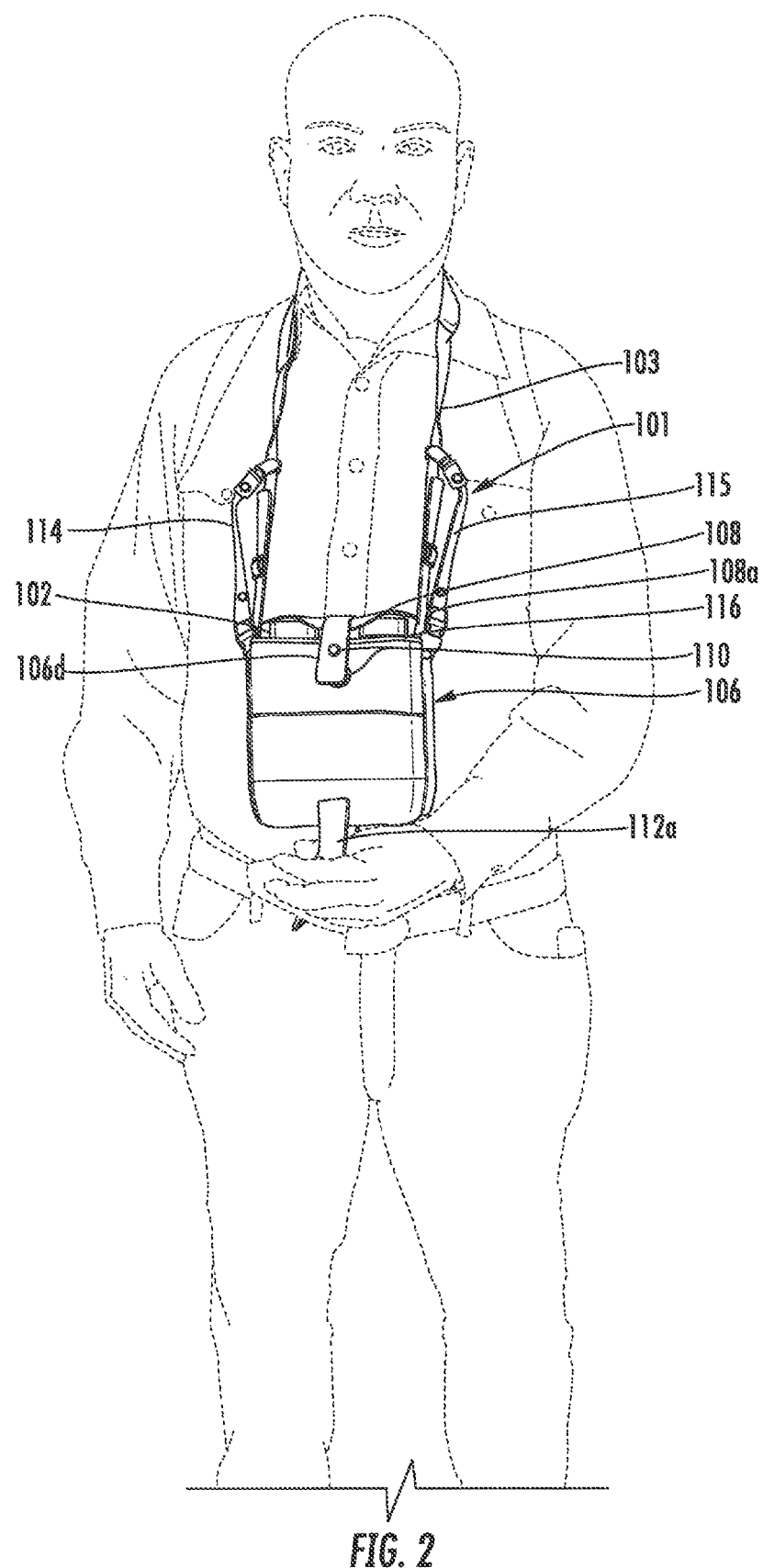
FIG. 2 shows a user grasping a bottom strap of the binocular case after the user has partially lowered the bottom strap and coupled binoculars case to cause the stationary binoculars supported by the neck strap to upwardly engage and force the lid of the case to separate the lid closure releasable magnetic fastener device and permit the eye pieces of the binoculars to emerge from the case to a position above the top opening of the case.
Figure 3:
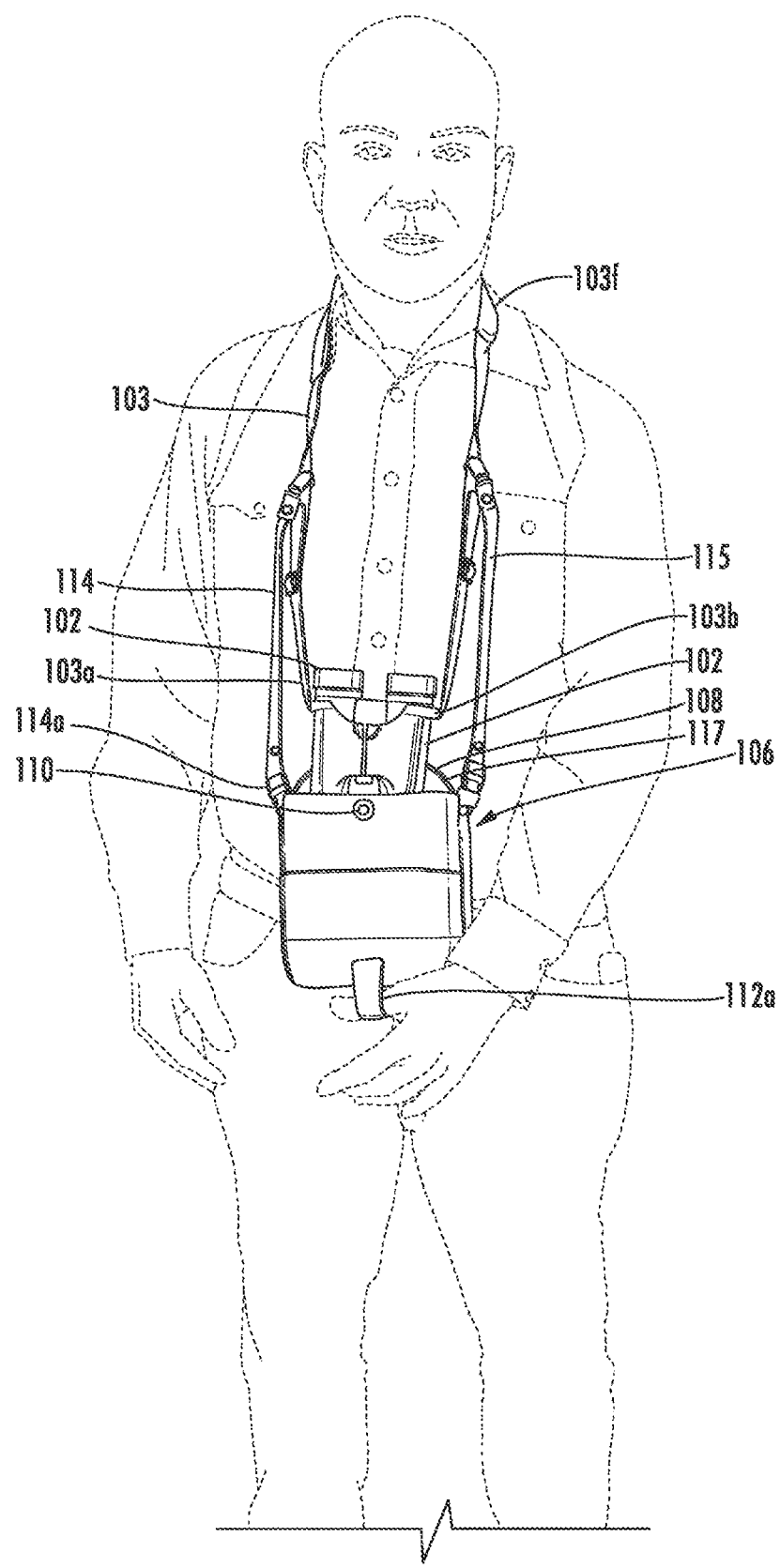
FIG. 3 shows the user having further lowered the bottom strap and coupled binoculars case to lengthen the elastic support straps coupling the case to the binocular neck straps and thereby more fully expose the binoculars in their normal position supported by the neck strap.

The case additionally has an exemplary bottom strap assembly 112 extending downwardly from the case bottom 106c for flexibly attaching the case bottom to the user's belt to prevent the case and binoculars from swinging fore and aft or from side to side as the user moves in the field. The exemplary embodiment shown in the Figures includes a strap loop 112a which is preferably coupled to and extends from the front side 106b to the bottom 106c of the case 106 and which is easily engaged by a thumb of the user to push the case downwardly when the user desires to use the binoculars, as shown in FIGS. 2-3. In addition, the exemplary bottom strap assembly 112 can include a connector 112b slideable on the strap loop 112a for engagement of a flexible and extensible cord 112c with a belt clip 112d such as a "Caribbeaner" clip or other common device for encircling and coupling to a belt or garment belt loop as desired. The short extensible cord 112c extending between the sliding connector 112b and the belt clip 112d provides a resilient link between the user's belt or garment and the case 106 when the user raises the binoculars to eye level as shown in FIG. 5, and the case comfortably seeks equilibrium between the elastic support straps 114 and 115 attached to the neck strap of the binoculars and the extensible bottom strap assembly cord 112d during use of the binoculars for viewing target objects or landscapes.

Figure 4:
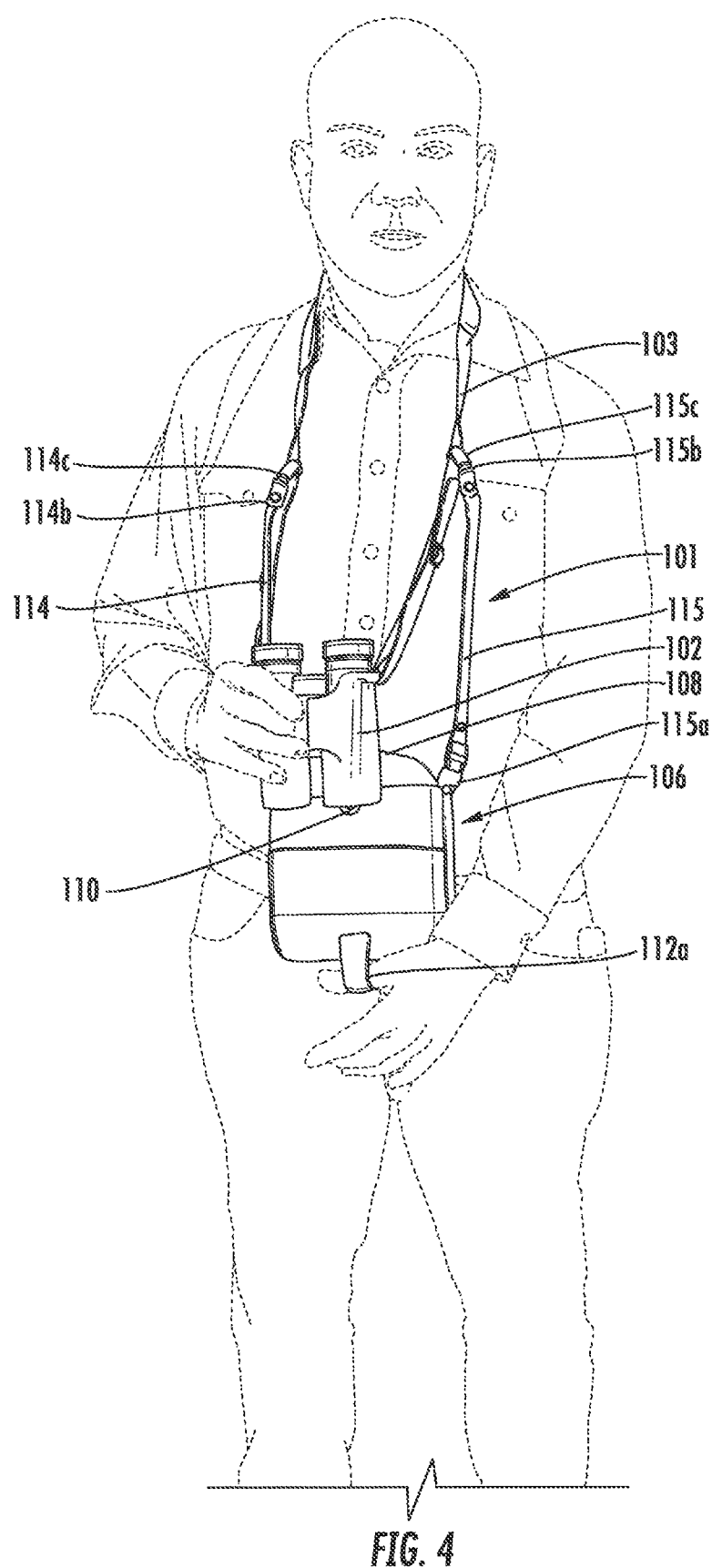
FIG. 4 shows the user having removed the binoculars from the case with one hand while holding the bottom strap and case in their fully lowered position with the other hand.
Figure 5:
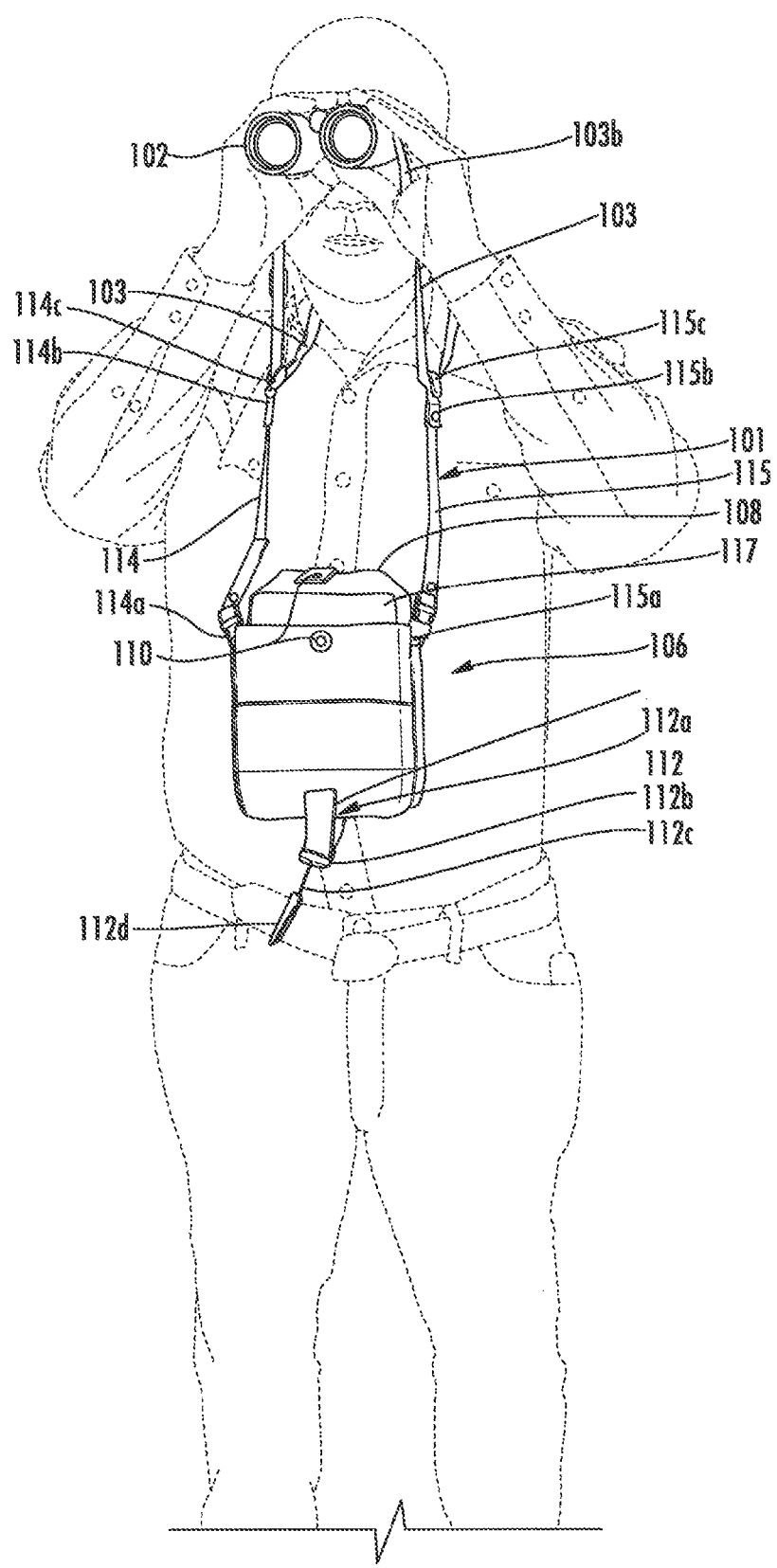
FIG. 5 shows the user having raised the binoculars to eye level for viewing a target object with both hands in a conventional manner, wherein the case has been raised to an equilibrium level near or above its normal carrying position by the combined action of the elastic support straps and the neck strap end portions.

Use of the optical instrument carrying case and support system in combination with the binoculars, as shown in FIGS. 1-5, is both simple and extremely efficient. The binoculars 102 are normally carried cased as shown in FIG. 1 when moving about or stationary in the field, including in indoor venues such as sports stadiums, arenas and theatres. When the user sees a distant object, landscape or other viewing target which deserves a closer look, the user simply engages the case bottom strap loop with a thumb and pushes down on the strap to lower the case 106, as shown in FIGS. 2 and 3. As the case starts to move, the releasable magnetic fastener device releases the case lid 108 to pivot upwardly to permit further extension of the elastic case support straps 114 and 115, and the further downward movement of the case 106 until the binoculars 102 are sufficiently withdrawn from the case 106, as shown in FIG. 3, to be grasped by the other hand of the user, as shown in FIG. 4, and raised to eye level for viewing, as shown in FIG. 5. Although the movements of the user, case and binoculars are sequentially described in the preceding sentence, it should be understood that the downward movement of the case responsive to the user's thumb movement followed by the grasping and raising of the binoculars to eye level by the hands of the user are only fractionally sequential and primarily coincident and continuous without requiring any other unfastening or non-productive movements by the user nor of the case and binoculars. The case automatically returns to an equilibrium convenient position during the raising of the binoculars, and for receiving the returned binoculars after use, which simply involves lowering the binoculars into the case and lowering the lid by one continuous hand movement for automatic lid engagement by the releasable magnetic fastening device.

The exemplary case 102 shown in FIGS. 1-5 is advantageously constructed of canvas, but other fabric, leather, plastic or elastomeric molded materials would also be suitable case materials. A plastic or elastomeric foam case liner 116 of medium selected firmness is provided in the exemplary case 106 shown herein for additional protection of the binoculars. As may be apparent in FIG. 5, the back side of the foam liner 116 has an upwardly extending lid extension member 117 which adheres to the underside of the lid 108 to position and hold the lid in a normally open position when the binoculars are removed from the case 106, thereby further facilitating efficient insertion of the binoculars back into the case after use. Optionally, the lid 108 can be closed and retained in closed position during binocular use by the magnetic fastener device 110.

It should also be understood that the shape of the case can be customized as to size and shape for the particular binoculars or other optical instruments to be carried therein. For example, digital electronic instruments and devices of various sizes, such as smart phones, tablets or other future portable electronic devices will require cases of various appropriate sizes. Likewise, non-elastic case support straps of greater length may be provided instead of the disclosed elastic carrying straps, but will then require that the case be raised by hand to receive the binoculars after use. In that case, the complete support for the optical instrument and the case will be provided by the neck strap 103. While the lid 108 is shown flexibly fastened or hinged to the back side of the case, it should be understood that the lid 108 could be similarly fastened to the top of the front side of the case with the neck strap indents 108a defined in the top rear corners of the lid. As indicated previously, for a slim thickness instrument the upper margins of the case may be self-closing and a lid may not be necessary or desirable.

It should also be understood that the optical instrument case 106 may be a standard case provided by the manufacturer of the optical instrument, or an aftermarket case designed for the optical instrument. In that event, an exemplary support system 101 of the present invention may consist of case support straps 114 and 115 having upper ends coupleable to neck strap intermediate portions and lower ends coupleable to an upper portion of the instrument case, and a bottom strap assembly coupleable to a lower portion of the instrument case and to the belt or garment of the user. In such an exemplary support system the case support straps and the bottom strap assembly advantageously include elastomeric portions to provide all of the desirable functional capabilities of the exemplary support systems shown in FIGS. 1-5 and described above.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise proportions or numerical ranges provided. Accordingly, these terms should be interpreted as indicating that insubstantial or inconsequential modifications or alterations of the subject matter described and claimed are considered to be within the scope of the invention as recited in the appended claims.

It should be noted that references to relative positions (e.g., "top" and "bottom") in this description are merely used to identify various elements as are oriented in the Figures. It should be recognized that the orientation of particular components may vary depending on the application in which they are used.

For the purpose of this disclosure, the term "coupled" means the joining of two members directly or indirectly to one another. Such joining may be stationary in nature or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It is also important to note that the construction and arrangement of the system, methods, and devices as shown in the various examples of embodiments is illustrative only. Although only a few embodiments have been described in detail in this disclosure, those skilled in the art who review this disclosure will readily appreciate that many modifications are possible (e.g., variations in sizes, dimensions, structures, shapes, proportions and materials of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. The order or sequence of any process or method steps may be varied or resequenced according to alternative embodiments. Other substitutions, modifications, changes and omissions may be made in the design, operating conditions and arrangement of the various examples of embodiments without departing from the spirit or scope of the present inventions.

While this invention has been described in conjunction with the examples of embodiments outlined above, various alternatives, modifications, variations, improvements and/or substantial equivalents, whether known or that are or may be presently foreseen, may become apparent to those having at least ordinary skill in the art. Accordingly, the examples of embodiments of the invention, as set forth above, are intended to be illustrative, not limiting. Various changes may be made without departing from the spirit or scope of the invention. Therefore, the invention is intended to embrace all known or later developed alternatives, modifications, variations, improvements and/or substantial equivalents.

The technical effects and technical problems in the specification are exemplary and are not limiting. It should be noted that the embodiments described in the specification may have other technical effects and can solve other technical problems.

What is claimed is:

1. A carrying case and support system for an optical instrument supportable by a neck strap of selectable fixed length having at least one end portion coupleable to the instrument, a connected neck support portion extendable around the neck of a user and an intermediate portion extending between the at least one end portion and the neck support portion, comprising:
    a) a carrying case having a body portion shaped and proportioned to receive the optical instrument and at least one said neck strap end portion coupled to the optical instrument, the body portion having a top opening adapted for reception and removal of the optical instrument;
    b) the carrying case having a pair of support straps each having a lower end coupled to an upper portion of the case and having an upper end coupleable to the at least one neck strap intermediate portion; and
    c) wherein an optical instrument supported by the said neck strap adjacent the front torso of a user and within the body portion of the carrying case may be accessed for optical viewing by user displacement of the case and the coupled case support strap lower ends downwardly to cause removal of a substantial portion of the optical instrument from the case and to permit the user to grasp the exposed optical instrument and raise it to user eye level for viewing, whereby the raising of the optical instrument to user eye level will facilitate the return of the at least one coupled end portion of the neck strap and the carrying case to their approximate carrying position for user replacement of the optical instrument in the case after use of the instrument.

2. The carrying case and support system of claim 1, wherein the carrying case has a lid coupled to said body portion and movable between a closed position for overlapping the top opening and an open position, the lid being retainable in a fastened closed position by a releasable fastening device, wherein the top opening is exposed and accessed by user engagement and displacement of the case downwardly to cause the vertically supported optical instrument to prevent corresponding downward movement of the case lid and the fastening device to release the lid to move to its open position, and such user displacement of the case further downwardly to cause removal of a substantial portion of the optical instrument from the case to permit the user to grasp the exposed optical instrument and raise it to user eye level for viewing.

3. The carrying case and support system of claim 1, wherein the support straps are elastically extensible, and each of the two case support straps has a lower end coupled to an upper portion of the case in spaced, opposed relation, and wherein each case support strap has an upper end coupled to a neck strap intermediate portion, and wherein the at least one elastically extensible support strap is adapted to increase in length with the downward displacement of the case by the user and to decrease in length upon disengagement of the case by the user to assist in the upward return of the case to its approximate carrying position.

4. The carrying case and support system of claim 2 wherein the lid is retainable in a fastened closed position by a releasable magnetic fastening device attached to at least one of the lid and the case.

5. The carrying case and support system of claim 3 wherein a bottom strap assembly is coupled to a bottom portion of the case to extend downwardly therefrom, the bottom strap assembly including a bottom belt clip adapted to be attached to the belt of the user whereby the case will be retained close to the torso of the user when the case is in its carrying position.

6. The carrying case and support system of claim 5 wherein the bottom strap assembly has an elastically extensible cord portion whereby when the optical instrument is raised by the user to user eye level for viewing a subject object the case will be supported between the at least one elastically extensible case support strap and the elastically extensible cord portion of the bottom strap assembly in an equilibrium position in its approximate carrying position.

7. The carrying case and support system of claim 1 wherein the case is adapted to receive, support and protect binoculars.

8. A carrying case for an optical instrument which instrument is supportable at an approximate mid-chest level of a user by a neck strap having a neck support portion and at least one end portion coupleable to the optical instrument, the carrying case including a support system comprising:
    a) a pair of carrying case support straps each having lower ends coupleable to the upper portion of the body of the carrying case for the optical instrument and strap upper ends coupleable to the neck strap of the optical instrument at an intermediate location on the neck strap between the neck strap neck support portion and the at least one end of the neck strap, whereby when the optical instrument is supported by the neck strap on the torso of a user the optical instrument is receivable within the body of the carrying case below a top opening of the body, and the carrying case is supportable by the carrying case support straps;
    b) a bottom strap assembly coupleable to a bottom portion of the body of the carrying case and including a releasable fastener for attachment of the bottom strap assembly to a belt or garment of a user whereby the case will be retained close to the torso of the user;
    c) whereby the user may access the optical instrument for optical viewing by engaging and downwardly displacing the bottom strap assembly and carrying case coupled thereto to cause partial removal of the independently supported optical instrument from the carrying case and permit the user to grasp the exposed optical instrument and raise it to user eye level for viewing, whereby the raising of the optical instrument to user eye level will facilitate return of the carrying case and case support strap lower ends to their approximate carrying positions for convenient user replacement of the optical instrument in the case after use of the instrument.

9. The support system for a carrying case for an optical instrument of claim 8, wherein said carrying case support straps are elastically extensible, and wherein the straps are adopted to increase in length when the case is engaged and displaced downwardly by the user, and be biased to decrease in length upon disengagement of the case by the user to assist in the return of the case to its approximate carrying position and the support of the case in the its carrying position.

10. The support system of claim 9 wherein the bottom strap assembly has an elastically extensible cord portion whereby when the optical instrument is raised by the user to user eye level for viewing a subject object the case will be supported between the elastically extensible carrying case support straps and the elastically extensible cord portion of the bottom strap assembly in an equilibrium position in its approximate carrying position.

* * * * *